Oct. 23, 1956  R. M. APEL ET AL  2,768,003
PASSENGER SAFETY CRASH BAR FOR VEHICLES
Filed Dec. 17, 1954
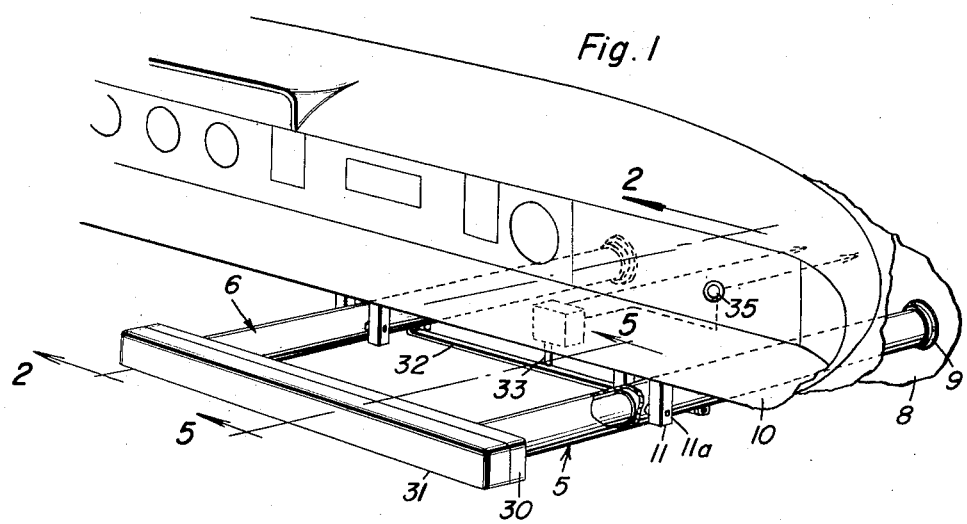
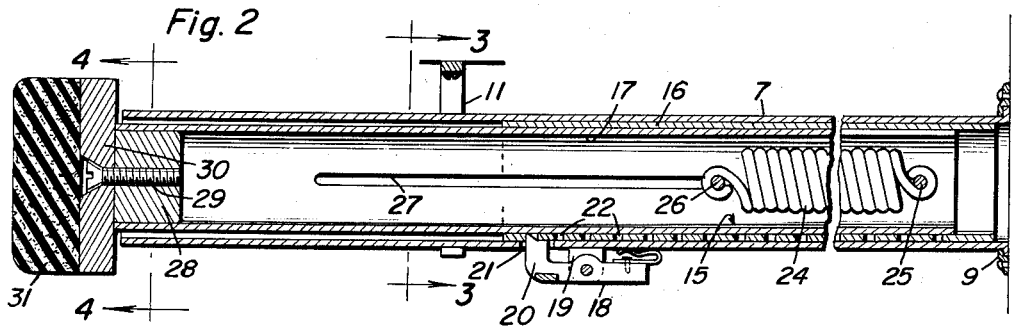
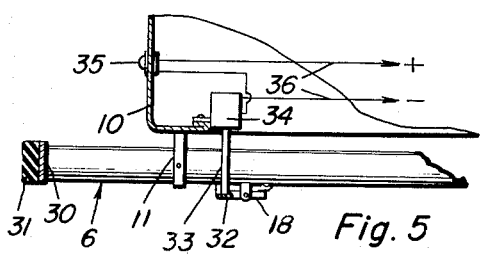
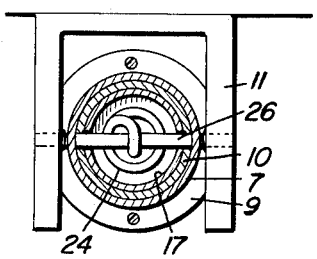
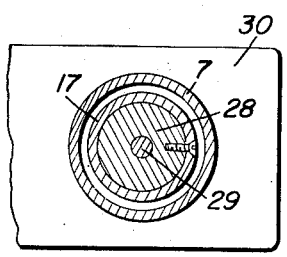
Rudolph Max Apel
William T. Brown
INVENTORS.
BY *Clarence A. O'Brien*
*and Harvey B. Jacobson*
Attorneys United States Patent Office 2,768,003
Patented Oct. 23, 1956

2,768,003

PASSENGER SAFETY CRASH BAR FOR VEHICLES

Rudolf Max Apel, Milford, and William T. Brown, Hamden, Conn.

Application December 17, 1954, Serial No. 475,956

2 Claims. (Cl. 280—150)

The present invention relates to new and useful improvements in crash bars for vehicles to protect an occupant thereof from being thrown forwardly against the windshield or other part of the vehicle by a sudden stopping thereof, such as by an excessive application of the brakes or as the result of a collision.

An important object of the invention is to provide a spring biased body bracing bar slidably supported under the instrument panel of a motor vehicle to protect an occupant of the front seat of the vehicle from being thrown forwardly and injured by striking the windshield or instrument panel.

Another object is to support the crash bar in a telescoping tube and including a fixed tube slidably supporting an extensible spring biased tube for adjusting the latter forwardly and rearwardly according to the most effective bracing position for the occupant of the vehicle.

A further object is to provide a device of this character of simple and practical construction, which is efficient and reliable in operation, strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is an enlarged longitudinal sectional view taken on a line 2—2 of Figure 1;

Figures 3 and 4 are transverse sectional views taken respectively on lines 3—3 and 4—4 of Figure 2, and Figure 5 is a sectional view taken on a line 5—5 of Figure 1.

Referring now to the drawing in detail, wherein for the purpose of illustration we have disclosed a preferred embodiment of my invention, the numerals 5 and 6 designate a pair of telescoping metal tubular units each including an outer tube or sleeve 7 secured at one end to a dashboard or firewall 8 of a motor vehicle by means of a flanged collar 9 and with the other end of each tube or sleeve 7 supported under the instrument panel 10 of the vehicle by hangers 11.

An extensible tube 15 is slidable in each tube or sleeve 7 and includes a front or outer tube 16 and a rear or inner tube 17, as determined by the front and rear portions of the vehicle, and tube 16 is slidable in tube or sleeve 7 and is locked in extensibly adjusted position therein by means of a pivoted catch 18 pivoted to an apertured ear 19 at the underside of tube or sleeve 7 and having a free end 20 movable inwardly and outwardly through an opening 21 in sleeve 7 to selectively enter a longitudinal row of openings 22 in tube 16. A spring 23 engages the other end of the catch to urge the catch in locked position in the openings.

Rear tube 17 is slidable in front tube 16 and a coil spring 24 is positioned therein with its front end attached to a transverse pin 25 adjacent the front end of tube 17 and with the rear end of the spring attached to a transverse pin 26 which is attached to front tube 16 and is slidable in longitudinal slots 27 at diametrically opposite sides of rear tube 17.

A plug 28 is secured in the rear end of each rear tube 17 by a screw 29 and a crash bar 30 is secured to the plugs of the pair of telescoping units 5 and 6 to support the bar in a transverse position at the front of the instrument panel. A resilient rubber padding 31 is secured to bar 30.

The free end portions of the catch members 18 of the pair of units 5 and 6 are connected to each other by a crossbar 32 in the path of the lower end of a vertical armature 33 of a solenoid 34 attached to the underside of the instrument panel and controlled by a switch 35 which connects the solenoid in a circuit 36 with the battery (not shown) of the motor vehicle.

In the operation of the device, the tapered surface on the free end 20 of the catch 18 will permit the crash bar 30 to be pulled rearwardly or away from the instrument panel thereby sliding the tubes 16 and 17 outwardly and positioning the crash bar 30 closely adjacent the front of a passenger occupying the front seat of the vehicle. When it is desired to move the crash bar 30 forwardly to a position adjacent the instrument panel, the switch 35 is closed to energize the solenoid and release the catches 18 thereby permitting forward sliding movement of tubes 16 and 17 as well as bar 30. By adjusting the flanged collars 9 on the firewall 8, the sleeves 7 may be pivoted in brackets 11 by pins 11a thereby adjusting the position of the crash bar 30.

Pressure subjected to the crash bar 30 by the passenger when suddenly thrown forwardly will slide tube 17 forwardly in tube 16 and such movement is checked or snubbed by the springs 23 to prevent the passenger from striking the instrument panel or windshield of the vehicle.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A crash bar comprising a tubular telescoping member composed of a tubular casing fixed to a part of an automobile under the instrument panel thereof, an extensible telescoping member including an inner tubular member and an outer tubular member slidable as a unit in said casing, means securing said outer tubular member in adjusted position to the casing, a crossbar fixed to the outer end of the inner tubular member, a coil spring enclosed within and having one end anchored to the inner tubular member, said inner tubular member having a pair of longitudinal slots at diametrically opposite sides thereof, and a transverse pin slidable in said slots and fixed to the outer tubular member and to which the other end of the coil spring is attached for snubbing relative inward movement of the inner tubular member.

2. A crash bar comprising a tubular telescoping member composed of a tubular casing fixed to a part of an automobile under the instrument panel thereof, an extensible telescoping member including an inner tubular member and an outer tubular member slidable as a unit in said casing, a pivoted catch supported by the casing and having a free end portion working inwardly and outwardly through an opening in the casing, said outer tubular member having a longitudinal row of openings in which the free end portion of the catch is selectively engaged to lock the outer tubular member in extensibly adjusted position to the casing, a crossbar fixed to the outer end of the inner tubular member, a coil spring enclosed within and having one end anchored to the inner tubular member, said inner tubular member having a pair of longitudinal slots at diametrically opposite sides thereof, and a transverse pin slidable in said slots and fixed to the outer tubular member and to which the other end of the spring is attached for snubbing relative inward movement of the inner tubular member.

References Cited in the file of this patent

UNITED STATES PATENTS

| | | |
|---|---|---|
| 1,548,870 | Crafton | Aug. 11, 1925 |
| 1,619,697 | Brown | Mar. 1, 1927 |
| 2,322,755 | Voorhies | June 29, 1943 |
| 2,529,458 | Orr | Nov. 7, 1950 |
| 2,654,616 | Mockli | Oct. 6, 1953 |

FOREIGN PATENTS

| | | |
|---|---|---|
| 840,958 | Germany | June 9, 1952 |